United States Patent
Knutson et al.

(10) Patent No.: US 6,563,862 B1
(45) Date of Patent: May 13, 2003

(54) DIGITAL VARIABLE SYMBOL RATE MODULATION

(75) Inventors: Paul Gothard Knutson, Indianapolis, IN (US); Kumar Ramaswamy, Indianapolis, IN (US); Dong-Chang Shiue, Carmel, IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/176,540

(22) Filed: Oct. 21, 1998

(51) Int. Cl.$^7$ ................................. H04L 5/16
(52) U.S. Cl. ..................... 375/219; 375/295; 341/61
(58) Field of Search .......................... 375/219, 220, 375/222, 261, 279, 280, 281, 295, 298, 302, 308, 354, 355, 358; 332/103; 370/277, 278, 280, 282, 294; 455/422, 73, 84, 88; 341/61

(56) References Cited

U.S. PATENT DOCUMENTS

| 5,365,545 | A | * | 11/1994 | Blackwell et al. | 375/222 |
| 5,764,113 | A | * | 6/1998 | Snell | 332/103 |
| 6,128,357 | A | * | 10/2000 | Lu et al. | 375/355 |
| 6,169,767 | B1 | * | 1/2001 | Strolle et al. | 375/302 |

OTHER PUBLICATIONS

Edward A. Lee et al., *Digital Communication*, © 1988 by Kluwer Academic Publishers, Chapter 15, pp. 560–586.
Floyd M. Gardner, *Interpolation in Digital Modems—Part I; Fundamentals*, IEEE Transactions on Communications, vol. 41, No. 3, Mar. 1993, pp. 501–507.
Lars Erup et al., *Interpolation in Digital Modems—Part II: Implementation and Performance*, IEEE Transactions on Communications, vol. 41, No. 6, Jun. 1993, pp. 998–1008.

* cited by examiner

*Primary Examiner*—Betsy L. Deppe
(74) *Attorney, Agent, or Firm*—Joseph S. Tripoli; Harvey D. Fried; Joseph J. Kolodka

(57) ABSTRACT

A wireless telephone system having a plurality of wireless handsets and a base unit, the base unit having a base transceiver. Each handset has a handset transceiver for establishing a wireless link over a shared channel with the base unit via the base transceiver, wherein the base transceiver transmits to a handset transceiver a first signal representing successive symbols at a first symbol rate. The handset transceiver has a receiver and a transmitter, and a local clock signal generator that provides clock signals at a local clock frequency. The receiver receives samples representing the first signal, and generates symbol error measurements used to cause a receiver interpolator to produce, in response to the received samples, samples taken at times synchronized to the successive symbols of the first signal. The handset transmitter transmits to the base transceiver a second signal representing successive symbols at a second symbol rate b y modifying the second symbol rate in accordance with the symbol error measurements so that the second symbol rate is substantially identical to the first symbol rate.

19 Claims, 4 Drawing Sheets

DIGITAL VARIABLE SYMBOL RATE MODULATION

BACKGROUND OF THE INVENTION

1. Field of the Invention

The present invention relates to digital signal processing systems and, in particular, to digital variable symbol rate modulation for providing digital modulated signals over a continuous range of symbol rates.

2. Description of the Related Art

Digital data transmission from a transmitter to a receiver requires a variety of digital signal processing techniques to allow the data to be transmitted by the transmitter and successfully recovered by the receiver. In digital wireless telephone systems, a wireless telephone handset unit communicates via digital radio signals with a base unit, which is typically connected via a standard telephone line to an external telephone network. In this manner, a user m a y employ the wireless handset to engage in a telephone call with another user through the base unit and the telephone network.

Multi-line wireless telephone systems are in use in various situations, such as businesses with many telephone users. Such systems employ a handset that communicates with up to N handsets simultaneously, typically with digital communications schemes, such as a spread-spectrum, time division multiple access (TDMA). In a spread spectrum system, bandwidth resources are traded for performance gains, in accordance with the so-called Shannon theory. The advantages of a spread-spectrum system include low power spectral density, improved narrowband interference rejection, built-in selective addressing capability (with code selection), and inherent channel multiple access capability. Spread-spectrum systems employ a variety of techniques, including direct sequencing (DS), frequency hopping (FH), chirp systems, and hybrid DS/FH systems.

In a TDMA system, a single RF channel is used, and each handset transmits and receives audio data packets as well as non-audio data packets during dedicated time slices or slots within an overall TDMA cycle or epoch. Other communications schemes include frequency division multiple access (FDMA), code division multiple access (CDMA), and combinations of such schemes. Various modulation schemes are employed, such as carrierless amplitude/phase (CAP) and quadrature amplitude modulation (QAM).

Such digital data is often transmitted as modulated signals over a transmission medium, such as the RF channel, in the form of binary bits of data. (Other transmission media often used for digital communications include asymmetric digital subscriber loop (ADSL) systems or cable modem systems.) The digital data is often modulated and transmitted in complex digital data form, in which the transmitted data comprises symbols from which the original data can be reconstructed by the receiver. Complex digital symbol data typically comprises real (in-phase, or "I") data, and imaginary (quadrature, or "Q") data (I, Q pairs). Each symbol of an I,Q pair may be a multi-bit number, and represent a point in a constellation on the I-Q plane. Each symbol is mapped or assigned to a prescribed coordinate in the I-Q plane, a four-quadrant Cartesian coordinate space using a look-up table (e.g., a ROM). The set of all symbol coordinates is the constellation. A prescribed number of symbols occupy assigned areas in the I-Q plane, depending on the modulation format. Depending on the number of bits/symbol of a given modulation format, the constellation contains a number of symbols at prescribed coordinates with respect to the I-Q axes. For example, in the QPSK modulation format, each sample has one of four($2^2$) phase positions, one in each quadrant, so that each symbol pair represents two bits of data.

To transmit a given input data value in a complex data system, the input data value to be transmitted is mapped to a symbol pair or pair of coordinates I,Q of a corresponding constellation point on a complex signal constellation having real and imaginary axes I and Q. These I,Q symbols, which represent the original data value, are then transmitted as part of data packets by a modulated channel. A receiver can recover the I,Q pairs and determine the constellation location therefrom, and perform a reverse-mapping to provide the original input data value or a close approximation thereof.

In a spread spectrum system, each symbol is transmitted by a string of "sub-symbols" or "chips", derived by multiplying the symbol times a pseudo-random number (PN) binary string. Such systems are thus characterized by a chip rate, which is related to the symbol rate. Spread spectrum systems may also be used, in general, to transmit any digital data, whether in complex format or not.

As noted above, digital data transmission requires a variety of digital signal processing techniques to allow the data to be transmitted by the transmitter and successfully recovered by the receiver. For example, the receiver side of a data transmission in a spread-spectrum digital wireless telephone system employs a variety of functions to recover data from a transmitted RF signal. These functions can include: timing recovery for symbol synchronization, carrier recovery (frequency demodulation), and equalization. The receiver includes automatic gain control (AGC), carrier tracking loops (CTL), and equalizer loops for each link. Timing recovery is the process by which the receiver clock (timebase) is synchronized to the transmitter clock. This permits the received signal to be sampled at the optimum point in time to reduce the chance of a slicing error associated with decision-directed processing of received symbol values. In some receivers, the received signal is sampled at a multiple of the transmitter symbol rate. For example, some receivers sample the received signal at twice the transmitter symbol rate. In any event, the sampling clock of the receiver must be synchronized to the symbol clock of the transmitter.

Carrier recovery is the process by which a received RF signal, after being frequency shifted to a lower intermediate passband, is frequency shifted to baseband to permit recovery of the modulating baseband information. Equalization is a process which compensates for the effects of transmission channel disturbances upon the received signal. More specifically, equalization removes intersymbol interference (ISI) caused by transmission channel disturbances. ISI causes the value of a given symbol to be distorted by the values of preceding and following symbols. These and related functions, and related modulation schemes and systems, are discussed in greater detail in Edward A. Lee & David G. Messerschmitt, *Digital Communication*, 2d ed. (Boston: Kluwer Academic Publishers, 1994).

Receivers require a relatively stable source of a sampling clock signal, which is also controllable so that it can be locked to the transmitter symbol clock. Voltage controlled crystal oscillators (VCXOs) have been used for this function, since the clock signal produced by a VCXO is stable but controllable over a relatively narrow range, to allow it to be locked to the transmitter symbol clock. However, a VCXOs and similar components are analog and thus relatively expensive, and also prone to drift over time. In addition, if it is necessary to receive signals from different transmitters having different symbol clock frequencies, it is necessary to have a VCXO for each such transmitter, further increasing the cost of the receiver. An improved "Timing recovery system for a digital signal processor" is described in European Patent Application No. EP 0 793 363, European filing date Feb. 20, 1997, Applicant Thomson Consumer Electronics, Inc., inventors Knutson, Ramaswamy, and McNeely (Knutson et al.).

Another disadvantage to utilizing analog timebases in receivers is that, in a multiline wireless telephone system for example, since base and handsets employ different timebases, the base must track the timing offsets of many handsets in order to be able to acquire the signals for each handset during its time slot.

SUMMARY

A wireless telephone system is presented having a plurality of wireless handsets and a base unit, with the base unit having a base transceiver. Each handset has a handset transceiver for establishing a wireless link over a shared channel with the base unit via the base transceiver, wherein the base transceiver transmits to a handset transceiver a first signal representing successive symbols at a first symbol rate. The handset transceiver has a receiver and a transmitter, and a local clock signal generator that provides clock signals at a local clock frequency. The receiver receives samples representing the first signal, and generates symbol error measurements used to cause a receiver interpolator to produce, in response to the received samples, samples taken at times synchronized to the successive symbols of the first signal. The handset transmitter transmits to the base transceiver a second signal representing successive symbols at a second symbol rate by modifying the second symbol rate in accordance with the symbol error measurements so that the second symbol rate is substantially identical to the first symbol rate.

DESCRIPTION OF THE PREFERRED EMBODIMENT

The present invention provides a transceiver with an improved transmitter having a digital variable symbol rate modulator. This allows expensive and drift-prone analog timing components such a s VCXOs to be avoided, and also allows a wide range of symbol or chip rates to be achieved using a single fixed frequency system clock. The present invention allows symbol rates to be changed on the fly in the digital domain. In addition, the use of the digital variable symbol rate modulator of the present invention allows the transmitter to modify the modulation to achieve a symbol rate that reflects the symbol rate of another transceiver with which the first transceiver is communicating via its receiver portion. This allows a base unit in a communication system to avoid having to track the timing offsets of many handsets in order to be able to rapidly acquire the signals for each handset during its time slot. (In direct sequence spread spectrum systems, a desired symbol rate is achieved by achieving a desired chip rate, as will be appreciated.)

In general, a signal represents successive symbols. In the case of a spread spectrum system, the signal represents successive chips of symbols, which chips may be functionally regarded herein as symbols as well. A "symbol" is thus the basic element of data or information conveyed by a signal, and may represent a complex symbol or symbol pair, a chip of a PN sequence that represents a complex symbol, or simply a binary "1" or "0".

A received signal is sampled to provide samples. Samples thus represent a signal, which represents symbols (or chips). The receiver side of a transceiver samples a received signal with an analog-to-digital converter (ADC or A/D), which provides samples representative of the signal, which in turn represents symbols. The transmitter side of a transceiver converts symbols into samples that constitute a signal, which is converted to an analog signal with a DAC.

Figure 1:
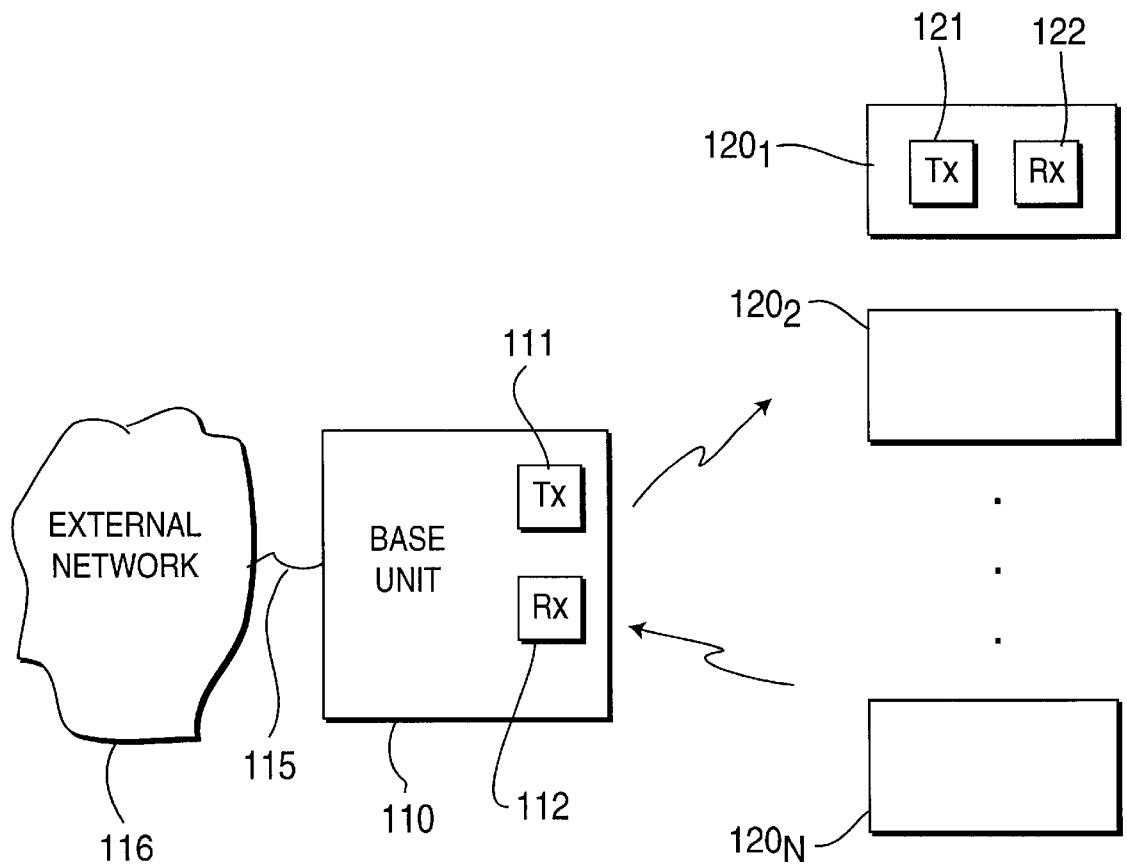
FIG. 1 is a block diagram of spread spectrum TDMA multi-line wireless telephone system, in accordance with an embodiment of the present invention.

Referring now to FIG. 1, there is shown a block diagram of TDMA multi-line wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. System 100 also comprises N wireless handsets $120_1, 120_2, \ldots 120_N$. Each has a transmitter and receiver unit (transceiver), such as transmitter 121 and receiver 122 of handset $120_1$. At any given time, some number (or none) of the handsets are operating or off hook (i.e., in the process of conducting a telephone call). System 100 thus provides a wireless network or link between the base station 110 and each handset $120_i$ ($1 \leq i \leq N$). In one embodiment, system 100 comprises 4 handsets $120_1$–$120_4$, all of which may be active simultaneously. In another embodiment, system 100 comprises a different number of handsets, e.g. N=12, of which up to 8 can be active or operational at a time.

Each transmitter 121 modulates and transmits modulated signals. A variety of digital modulation formats may be employed in such systems, including: QAM, CAP, PSK (phase shift keying), PAM (pulse amplitude modulation), VSB (vestigial sideband modulation), FSK (frequency shift keying), OFDM (orthogonal frequency division multiplexing), and DMT (discrete multitone modulation).

In the present invention, instead of or in addition to utilizing analog timebases in transceivers of a digital communication system, and the base unit tracking the timing offsets of many handsets, the transmitter 121 of each handset 120i implements the digital variable symbol rate modulation of the present invention. The transmitter 111 of base unit 110 may also implement the modulation scheme of the present invention. Receiver portion 122 of each handset transceiver preferably implement a digital demodulation scheme, such as the timing recovery system described in Knutson et al.

In the modulation scheme implemented by transmitter 121 of each handset, each handset transmitter provides for the synthesis of digital modulated signals over a continuous range of symbol rates, as described in further detail below. This allows the handset to transmit at the same symbol rate as the base, even though the timebases in the two devices are independent. Each handset adjusts its own transmission symbol timing without analog components, to reflect the base symbol rate, which allows the base to quickly acquire the signal without having to track timing offsets of many handsets.

Figure 2:
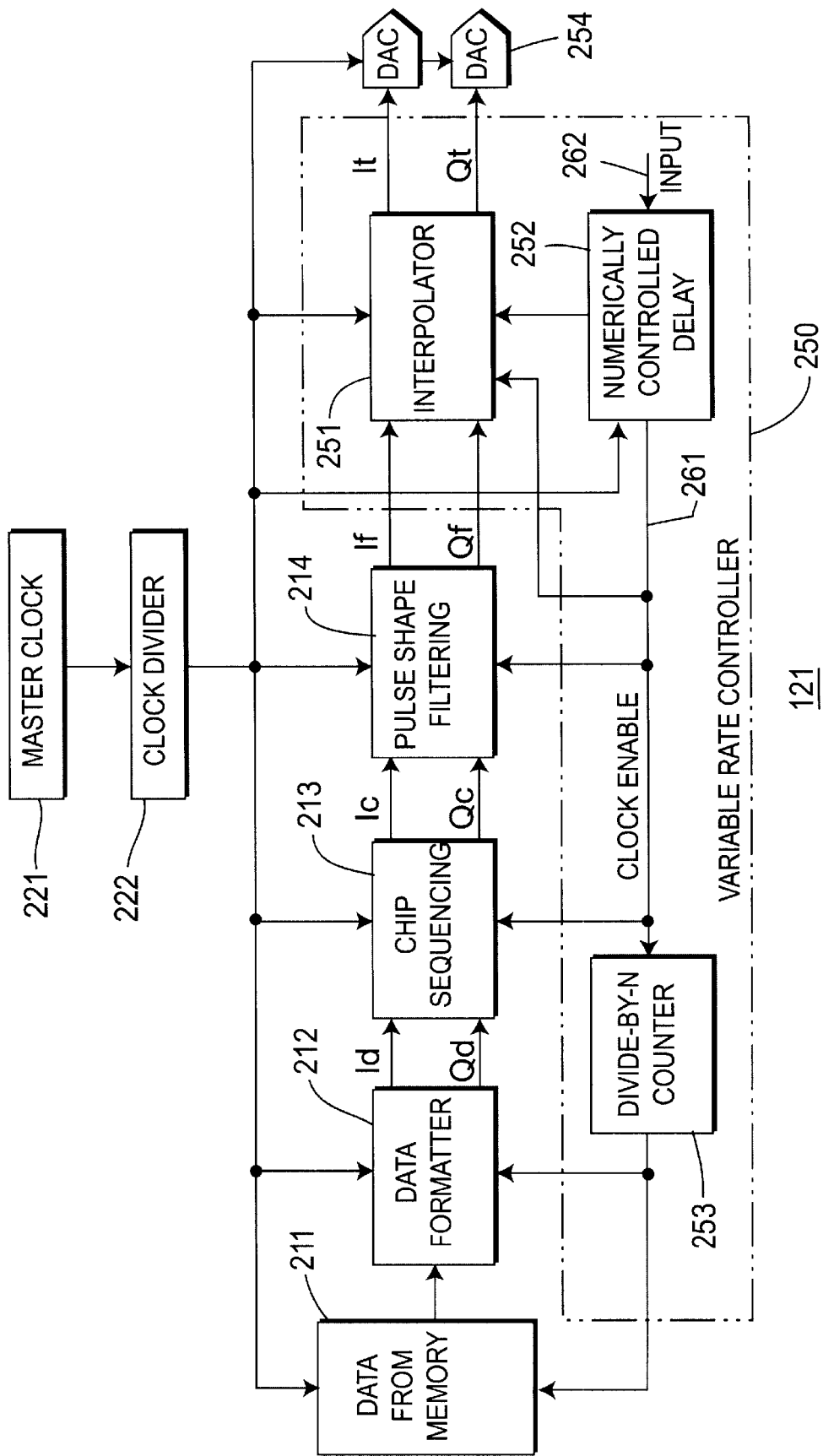
FIG. 2 is a block diagram illustrating a transmitter of the system of FIG. 1 in further detail, in accordance with an embodiment of the present invention.

Referring now to FIG. 2, there is shown a block diagram illustrating a transmitter 121 of system 100 of FIG. 1 in further detail, in accordance with an embodiment of the present invention. Transmitter 121 comprises master clock 121 and clock divider 222; data source 211, data formatter 212, chip sequencer unit 213, pulse shape filter 214, digital-to-analog converters (DACs) 254; and variable rate controller 250, which includes numerically controlled delay (NCD) 252, interpolator 251, and divide-by-N counter 253. NCD 252 outputs a clock enable signal on line 261 and receives an input delay parameter or factor (delay control value) for via line 262. The delay parameter determines the ratio between he input sample (chip) rate and output sample (chip) rate for interpolator 251.

Master clock 221 is a stable oscillator such as a crystal oscillator, which provides a clock signal having a master clock frequency of at least 2× the chip rate. (In a non-spread spectrum system, the actual symbol rate is relevant rather than the chip rate.) For example, the master clock frequency may be 50 MHz, so that clock divider 222 provides a 25 MHz clock, resulting in a fixed sampling frequency at the output of DACs 254 of 25 MHz.

Data is provided from a memory, for example, by data source 211. Data provided by memory 211 includes channel coding, randomizing and training data. Formatter 212 converts the data bitstream from source 211 into symbols. In the case of QPSK, 2 bits are mapped to one of four possible symbols. In the case of 8 VSB, 3 bits are mapped to one of eight possible symbols. For QPSK spread spectrum, 2 bits are mapped to one of four I, Q symbols, which are multiplied by the PN sequence in sequencer 213.

Data formatter 212 converts the raw input data from source 211 to packets and symbols Id, Qd. Chip sequencer 213 spreads these symbols over a binary sequence for spread spectrum purposes. This is done, for example, by taking an input of +1 or −1, converting it to an N-bit identical string (e.g., N=16), and multiplying it by each bit of the binary sequence. Thus, for each symbol, the bit sequence or its negative is transmitted. The binary sequence may be any sequence with good correlation properties, such as a PN sequence. The spread spectrum pulses are shaped for transmission by pulse shape filter 214, and are then ready to be frequency shifted to an RF channel by DACs 254.

Filter 214 creates the pulse shape which carries the symbol (or chip, in a spread spectrum system). This pulse shape is such that, when sampled at the correct time, all previous and subsequent pluses have no impact on the current pulse. The raised cosine pulse is a commonly used pulse shape. Pulse shaping filters are generally known (see, for example, "Digital Communications," Lee and Messerschmitt, section 8.2 Detection of Passband Signals-Matched Filters (Kluwer Academic Press, Boston, 1988).

NCD 252 controls interpolator 251, in response to the input delay parameter to vary the system symbol rate. Symbol rate is adjusted because samples from pulse shaping filter 214 are generated at a multiple of chip rate (typically 2 samples/chip, where chip rate has a fixed relationship to symbol rate, i.e. 15 chips/symbol). Interpolator 251 is a variable phase delay filter, such as a four-tap piecewise parabolic filter. For example, to achieve a chip rate of 10 MHz (½ the sample rate at the input of interpolator 215), NCD 252 must control the timing of pulse shaping filter 214 and the other components of transmitter 121 accordingly, and must control interpolator 251 so that it outputs 1.25 samples to DACs 254 for every input sample provided by pulse shape filter 214 (at 2 samples/chip). Thus, the variable rate controller 250 based transmitter 121 of the present invention allows the synthesis of digital modulated signals over a continuous range of symbol rates, using only a single oscillator, as long as the oscillator is faster than the maximum sample rate with some implementation margin (e.g. >2× chip or symbol rate), and as long as the master clock is some multiple of the desired chip rate. This allows changing to a desired chip rate simply by changing the clock applied to chip sequencer 213 and pulse shaping filter 214 and directly modifying interpolator 251 accordingly. Because any sufficiently fast and stable oscillator may be employed, any sufficient clock in the handset system may be used, such as the processor clock.

Figure 3:
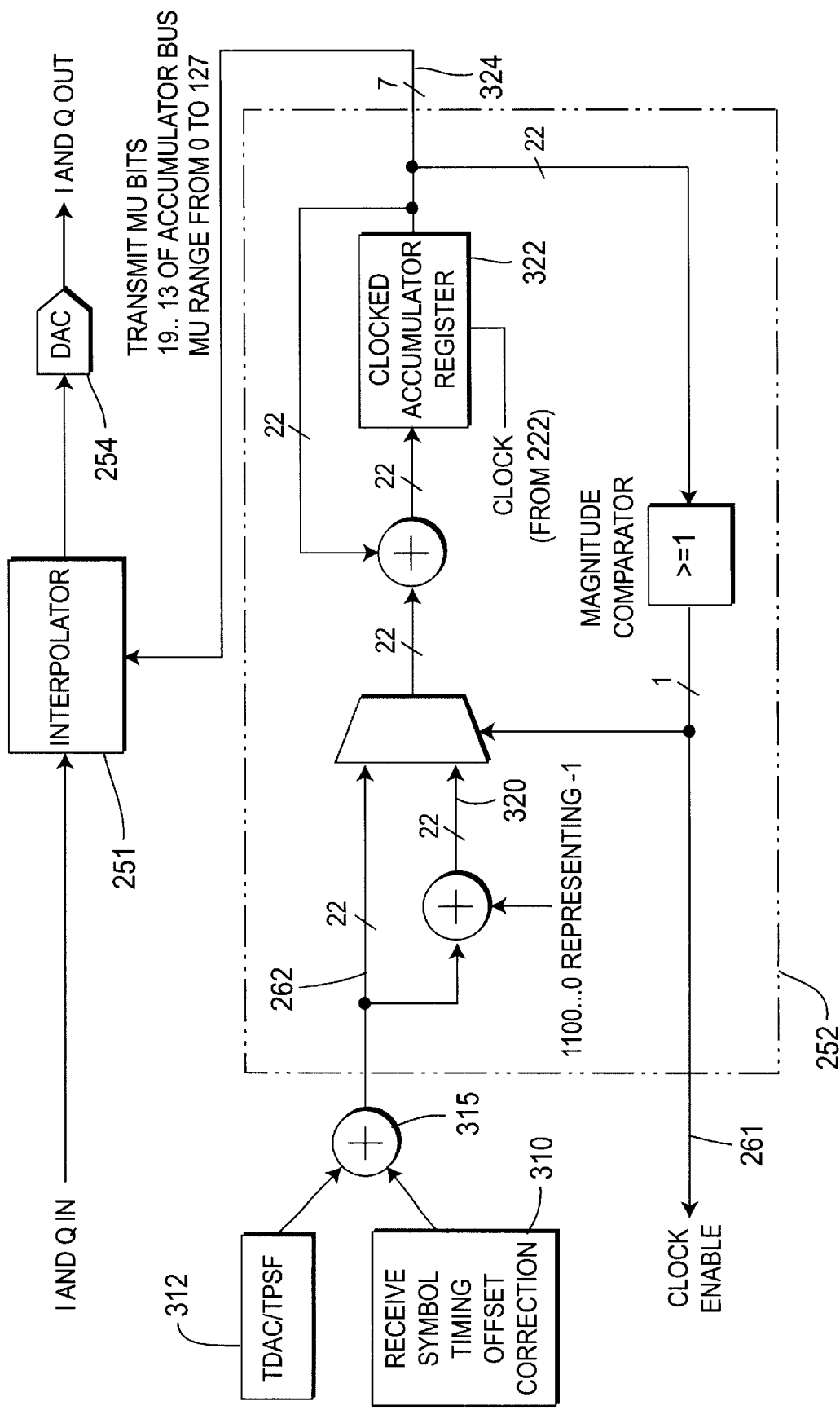
FIG. 3 is a block diagram illustrating the variable rate controller of the transmitter of FIG. 2 in further detail, in accordance with an embodiment of the present invention.

Thus, in the present invention, variable rate controller 250 enables clock signals at a desired rate, and controls interpolator 251 also. Variable rate controller 250 derives a gated or enabled clock from the fixed system clock to allow interpolator 251 to receive symbols If, Qf, at any desired sample rate, and still provide output signals It, Qt at a fixed sample rate. Under the control of NCD 252, interpolator 251 is stepped through delays which generate evenly spaced samples at the DAC rate. The DAC signal is uniformly sampled at some master clock which is greater than the highest rate input to the interpolator, for simplicity of control. The expression $$\frac{t_{dac}}{t_{psf}}$$

describes the delay control value for NCD 252, where $t_{dac}$ is the sample period of DACs 254, and $t_{psf}$ is the sample period of pulse shaping filter 214. This expression is normalized to the datapath used in the NCD, for example, a 22 bit datapath with 2 integer and 20 fractional bits will require that the ratio be multiplied by $2^{20}$, which represents 1 in the datapath numbering system. Since the samples ($I_t$, $Q_t$) output by the interpolator are spaced closer in time than the input samples ($I_f$, $Q_f$), this expression means that for each input sample the phase of interpolator 251 must be advanced by the ratio of the output sample rate (DAC) to the input sample rate (Pulse shaping filter). This is the value at signal 262 in FIG. 3. Since the controlled delay range of the interpolator spans only one sample, when additional input samples are required the phase of the interpolator is adjusted by $$\frac{t_{dac}}{t_{psf}} - 1$$

which is represented by signal 320 of FIG. 3. The clock enable of the interpolator 251 input register, the pulse shaping filter 214, and preceding signal processing logic is disabled when the phase change is within the span of the interpolator (e.g. when signal 262 is selected), and is enabled when new data is required to be input to the interpolator from pulse shaping filter 214 (e.g. when signal 320 is selected). The NCD function of NCD 252 accumulates delay with respect to samples input from the pulse shaping filter 214.

Referring now to FIG. 3, there is shown variable rate controller 250 of transmitter 121 in further detail, in accordance with an embodiment of the present invention. As illustrated, the delay control value is provided via line 262, from summing node 315. Summing node 315 receives symbol timing offset correction 310 and frequency factor 312. Frequency factor 312 is represented by the expression $$\frac{t_{dac}}{t_{psf}}$$

in the numeric format of the NCD datapath where $t_{dac}$ is the sample period of the DACs 254, and $t_{psf}$ is the sample period of the input to the interpolator 251. Receive Symbol Timing Offset correction 310 is a deviation used to adjust the oscillator in the case where $t_{dac}$ is not exactly what is expected. If the delay span of the interpolator is exceeded, which is represented by a value greater than 1 in the NCD accumulator 322, the input data registers of interpolator 251 are enabled (as are all preceding datapaths) to get additional data, the NCD is adjusted using signal 320 which subtracts 1 input delay from the signal 262 which represents one output delay. If the delay span of the interpolator is not exceeded, the input data register of interpolator 251 are held (as are all preceding datapaths), and the NCD is adjusted using signal 262, which represents one output delay. The control signal to the interpolator 324, called $\mu$, is the fractional part of the NCD accumulator 322. The accumulator 322 must have enough bits to accurately represent the sample rate change caused by the interpolator, but the phase information 324 sent to the interpolator 251 need only provide enough precision to reconstruct a signal represented by the bit width of the transmitter and interpolator datapath. For one implementation, while 20 fractional bits are used in the NCD accumulator, only 7 fractional bits are conveyed as the phase control to the interpolator 251 via signal 324.

As will be appreciated, NCD 252 and DACs 254 of controller 250 operate on a fixed clock which is greater than the sample rate of the preceding system, i.e. items 211, 212, 213, 214, preferably 2x the chip rate (the master clock 221 rate). When the clock enable line 261 is inactive to the rest of the system, NCD 252 generates interpolator phase numbers for the multiple output clocks for each input clock. The interpolator filter state is held when there is no clock enable, but the phase data (delay control) is delayed by one DAC period of delay.

As explained previously, the receiver portion 122 of the transceiver for each handset preferably implement a digital demodulation scheme, such as the timing recovery system described in Knutson et al. This allows the receiver to digitally demodulate a received signal at any symbol rate.

For example, transmitter 111 of base unit 110 transmits a signal over a digital link to receiver 122 of handset 120, which digitally demodulates the received signal by locking onto the received signal at the exact symbol and sample rates used by transmitter 111. As described in further detail below, when receiver 122 locks on to the timing of a signal received from base unit 110, it generates precise measurements of the symbol (chip) timing rate of the received signal, with respect to its local timebase. These measurements may be referred to as "receive symbol timing frequency error" measurements by which receiver 122 adjusts its various loops, such as AGC, CTL, and equalization to achieve the same symbol rate as used by transmitter 122. The error measurements thus represent the difference between the symbol rate of the handset that would be generated due to its master clock 221, and the symbol rate of the incoming signal.

This error information (the timing rate measurement with respect to the local timebase) is digital, and thus may be provided to transmitter 122 of the handset transceiver to generate offset correction 310. This allows the symbol rate of transmitter 122 to be modified, in accordance with the digital demodulation of receiver 121, so that the symbol rate of transmitter 122 is exactly the same as the symbol rate of receiver 121 and thus the same as the symbol rate of transmitter 111 of base unit 110. Therefore, implementing digital demodulation in both receiver and transmitter of the handset transceiver allows the transmitter to reflect exactly the symbol rate of base unit 110.

Figure 4:
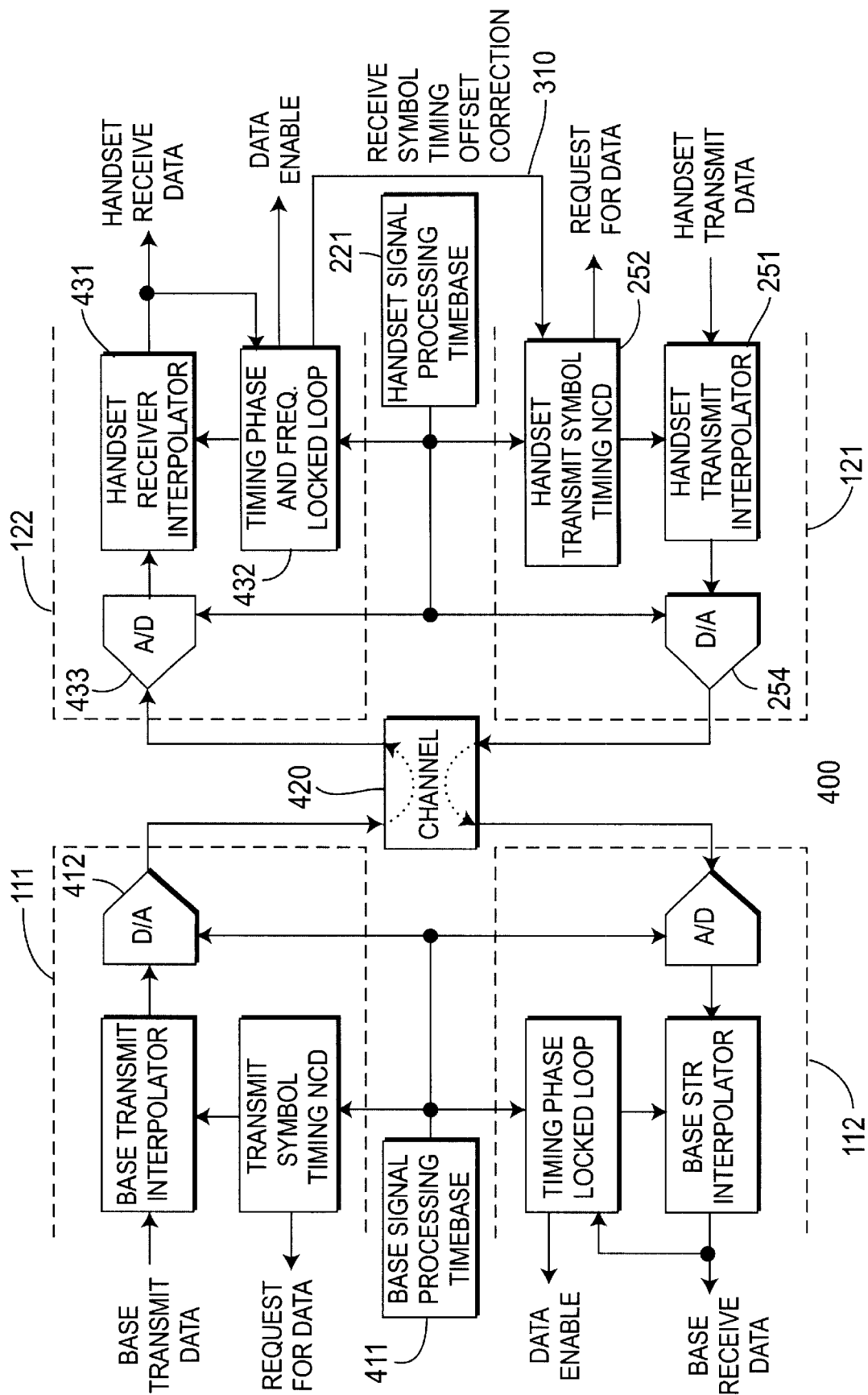
FIG. 4 is a block diagram showing a base unit transceiver and a handset transceiver of the system of FIG. 1, in accordance with an embodiment of the present invention.

Referring now to FIG. 4, there is shown a block diagram illustrating a portion of the transceivers of base unit 110 and a handset $120_1$ of system 100, in accordance with an embodiment of the present invention. Thus, the transceiver of base unit 110 includes transmitter 111 and receiver 112, driven by a common base timebase or clock 411. The transceiver of handset $120_1$ includes transmitter 121 and receiver 122, driven by a common handset timebase or clock 221. The two transceivers communicate via signals transmitted through RF channel 420. Each transmitter 111, 121 implements the digital variable symbol rate modulation of the present invention, and each receiver 112, 122 preferably implement a digital demodulation scheme, as described previously.

Clocks 411, 221 are fixed timebases, and thus no VCXO is required. Transmitter 111 thus transmits a signal to receiver 122 at a given symbol (chip) rate, in accordance with its timebase 411. DAC 412 of transmitter 111 converts input symbols into analog samples constituting a signal, transmitted via RF channel 420. This analog signal is received by ADC 433 of receiver 122, which provides digital samples to interpolator 431, which samples are taken at an initial fixed sample rate derived from local clock or timebase 221, which is at least 2x the maximum symbol (or chip) rate of the signal transmitted by the base unit. If receiver 122 samples the input signal at greater than twice the transmitter symbol rate, receiver 122 can adapt and receive input any symbol rates less than half the initial fixed sample rate. For example, for an initial sample clock (221) frequency of 62 MHz, symbol rates between 20 MSymbols/sec and 30 MSymbols/sec can be supported.

Interpolator 431 produces samples taken at times synchronized to the successive symbols transmitted by base unit 110's transmitter 111. Timing phase and frequency locked loop 432 detects a phase error between the sample times of the transmitter synchronized samples produced by interpolator 431 and times of the successive transmitter symbols, and generates a phase error signal (also referred to as the receive symbol timing frequency error measurements). This may be used to produce a delay control signal to control the interpolator 431. The interpolation function is essentially a timing adjustment function, and has sometimes been referred to as digital phase shifting and sampling rate conversion. Thus, receiver 122 locks onto this signal and thus to the timing from the base 110, via interpolator 431 and timing phase and frequency locked loop 432, and generates the receive symbol timing frequency error measurements. The digital timing recovery system of receiver 122 therefore provides the receive symbol error measurement, which is a number proportional to $$\frac{t_{2\,chip}}{t_{ad}} \quad \text{or} \quad t_{2\,chip} - t_{ad},$$

where $t_{2chip}$ is the sample period of 2x the chip rate of the transmitter 111, which is applied to DAC 412; and $t_{ad}$ is the sample period of DAC 423 of receiver 122, which is identical to $t_{dac}$. Since $t_{ad}$ and $t_{dac}$ are identical, providing the error to NCD 252 in the form of receive symbol timing offset correction 310 will precisely invert the process and send back to the base a signal having a symbol (chip) rate identical to that sent from the base. This allows base unit 110 to avoid having to track the timing offsets of many handsets in order to be able to acquire the signals for each handset during its time slot. The present invention effectively locks multiple transceivers together in the digital domain.

In addition to digital communications of a wireless telephone system as described hereinabove, the present invention is also applicable to BPSK, QPSK, CAP and QAM, for example, as well as to VSB modulation systems such as employed by the Grand Alliance High Definition Television (HDTV) system proposed for use in the United States. One skilled in the art will recognize what design changes are required to adapt the disclosed transmitter modulation system to the desired modulation scheme, and will understand how to design the illustrated components to operate with the desired modulation scheme.

The disclosed multiple symbol rate modulation system may b e advantageously used in cable or wireless digital home networks, in digital television modulators, or in transmodulators for demodulating and remodulating to another format, e.g., from QPSK to QAM.

In addition to the previous advantages described herein, the use of VCXOs may b e avoided and the use of any available stable oscillator may be used instead, which may be shared by both receiver and transmitter portions of a transceiver. In addition, in the base unit, because of the digital locking of base unit and multiple transceivers, the base unit need use only one timebase for all logical receivers, and to avoid using multiple VCXOs, since the same timing and clock can be shared for all handsets.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the principle a and scope of the invention a s recited in the following claims.

What is claimed is:

1. A first transceiver for communicating with a second transceiver that transmits to the first transceiver a first signal representing successive symbols at a first symbol rate, the first transceiver comprising:
   (a) a receiver for receiving samples representing the first signal and for generating symbol error measurements used to cause a receiver interpolator to produce, in response to the received samples, samples taken at times synchronized to the successive symbols of the first signal; and
   (b) a transmitter for transmitting to the second transceiver a second signal representing successive symbols at a second symbol rate by modifying the second symbol rate in accordance with the symbol error measurements so that the second symbol rate is substantially identical to the first symbol rate.

2. The first transceiver of claim 1, wherein the transmitter comprises:
   a transmitter interpolator for receiving samples at a multiple of the second symbol rate and for providing interpolated samples at a sample rate equal to a receive analog-to-digital convert rate to a digital-to-analog converter (DAC) and
   a numerically controlled delay (NCD) for receiving a frequency factor approximately equal to a desired ratio between the second symbol rate and sample rate, an offset factor based on the symbol timing error measurements, and a local clock signal having a local clock frequency, and for providing an
   interpolator control signal to the transmitter
   interpolator based on the frequency factor and the offset factor.

3. The first transceiver of claim 2, further comprising a fixed frequency clock signal source for generating the local clock signal, wherein the local clock frequency is a fixed frequency at least twice a highest expected first symbol rate.

4. The first transceiver of claim 2, wherein the NCD provides a clock enable signal, based on the frequency factor, the offset factor, and the local clock signal, for controlling circuitry in the transmitter coupled to an input side of the transmitter interpolator.

5. The first transceiver of claim 2, wherein the transmitter interpolator comprises a piecewise parabolic filter.

6. The first transceiver of claim 1, wherein the first transceiver is a handset transceiver of a first wireless handset;
   the second transceiver is a base transceiver of a base unit;
   the first wireless handset and the base unit are part of a wireless telephone system further comprising a plurality of other wireless handsets, each handset comprising a handset transceiver for establishing a wireless link over a shared channel with the base unit via the base transceiver.

7. The first transceiver of claim 6, wherein the wireless link is a time-division multiple access (TDMA) link, in which each handset communicates during an exclusive time slot of a TDMA scheme that allocates time slots to handsets.

8. The first transceiver of claim 6, wherein the wireless telephone system is a direct sequence spread spectrum system in which each successive symbol is a product of a symbol and an n-chip spreading sequence.

9. In first a transceiver having a local clock signal generator, a receiver, and a transmitter, a method for communicating with a second transceiver that transmits to the first transceiver a first signal representing successive symbols at a first symbol rate, the method comprising the steps of:
   (a) providing, with the local clock signal generator, clock signals at a local clock frequency;
   (b) receiving, with the receiver, samples representing the first signal and generating, with the receiver, symbol error measurements used to cause a receiver interpolator to produce, in response to the received samples, samples taken at times synchronized to the successive symbols of the first signal; and
   (c) transmitting from the transmitter to the second transceiver a second signal representing successive symbols at a second symbol rate by modifying the second symbol rate in accordance with the symbol error measurements so that the second symbol rate is substantially identical to the first symbol rate.

10. The method of claim 9, wherein the transmitter comprises:
    a transmitter interpolator for receiving samples at the second symbol rate and for providing interpolated samples at a sample rate to a digital-to-analog converter (DAC); and
    a numerically controlled delay (NCD) for receiving a frequency factor approximately equal to a desired ratio between the second symbol rate and sample rate, for receiving an offset factor based on the symbol error measurements, and for providing an interpolator control signal to the transmitter interpolator based on the frequency factor and the offset factor.

11. The method of claim 10, wherein the transmitter interpolator comprises a piecewise parabolic filter.

12. The method of claim 9, wherein:

the first transceiver is a handset transceiver of a first wireless handset;

the second transceiver is a base transceiver of a base unit;

the first wireless handset and the base unit are part of a wireless telephone system further comprising a plurality of other wireless handsets, each handset comprising a handset transceiver for establishing a wireless link over a shared channel with the base unit via the base transceiver.

13. The method of claim 12, wherein the wireless link is a time-division multiple access (TDMA) link, in which each handset communicates during an exclusive time slot of a TDMA scheme that allocates time slots to handsets.

14. The method of claim 12, wherein the wireless telephone system is a spread spectrum system in which each successive symbol is a product of a symbol and an n-chip spreading sequence.

15. The method of claim 9, wherein the local clock signal generator is a fixed frequency clock signal source, and the local clock frequency is at least twice a highest expected first symbol rate.

16. A wireless telephone system, comprising:

(a) a base unit having a base transceiver; and (b) a plurality of wireless handsets, each handset comprising a handset transceiver for establishing a wireless TDMA link over a shared channel with the base unit via the base transceiver in accordance with a TDMA scheme in which each handset communicates during an exclusive time slot of a TDMA epoch, wherein the base unit transmits to the handset transceiver of a handset a first signal representing successive symbols at a first symbol rate, the handset transceiver comprising:

(a) a receiver for receiving samples representing the first signal and for generating symbol error measurements used to cause a receiver interpolator to produce, in response to the received samples, samples taken at times synchronized to the successive symbols of the first signal; and (b) a transmitter for transmitting to the base transceiver a second signal representing successive symbols at a second symbol rate by modifying the second symbol rate in accordance with the symbol error measurements so that the second symbol rate is substantially identical to the first symbol rate.

17. The system of claim 16, wherein the transmitter comprises:

a transmitter interpolator for receiving samples at the second symbol rate and for providing interpolated samples at a sample rate to a DAC; and an NCD for receiving a frequency factor approximately equal to a desired ratio between the second symbol rate and sample rate, an offset factor based on the symbol error measurements, and a local clock signal having a local clock frequency, and for providing an interpolator control signal to the transmitter interpolator based on the frequency factor and the offset factor.

18. The system of claim 17, wherein the handset transceiver further comprises a fixed frequency clock signal source for generating the local clock signal, wherein the local clock frequency is a fixed frequency at least twice a highest expected first symbol rate.

19. The system of claim 16, wherein the wireless telephone system is a spread spectrum system in which each successive symbol of a transmitted signal is a product of a symbol and an n-chip spreading sequence.

* * * * *